United States Patent
Kalita et al.

(10) Patent No.: US 12,524,454 B2
(45) Date of Patent: Jan. 13, 2026

(54) VALIDATION SYSTEM AND METHOD FOR CONCURRENT VISUAL VALIDATION OF TWO OR MORE ELECTRONIC DOCUMENTS

(71) Applicant: Quantiphi, Inc, Marlborough, MA (US)

(72) Inventors: Bhaskar Kalita, Marlborough, MA (US); Arunima Gautam, Marlborough, MA (US); Sayantani Chaudhuri, Mumbai (IN); Sreejith S, Mumbai (IN); Parikshit Prasann Thatte, Mumbai (IN)

(73) Assignee: Quantiphi, Inc, Marlborough, MA (US)

( * ) Notice: Subject to any disclaimer, the term of this patent is extended or adjusted under 35 U.S.C. 154(b) by 0 days.

(21) Appl. No.: 18/421,969

(22) Filed: Jan. 24, 2024

(65) Prior Publication Data
US 2025/0238454 A1    Jul. 24, 2025

(51) Int. Cl.
G06F 16/34     (2025.01)
G06V 30/416    (2022.01)

(52) U.S. Cl.
CPC ............ *G06F 16/34* (2019.01); *G06V 30/416* (2022.01)

(58) Field of Classification Search
None
See application file for complete search history.

(56) References Cited

U.S. PATENT DOCUMENTS

| | | | |
|---|---|---|---|
| 10,599,753 B1* | 3/2020 | Eisner | G06F 40/197 |
| 11,829,399 B1* | 11/2023 | Pillai | G06F 40/279 |
| 2007/0016855 A1* | 1/2007 | Masukawa | G06F 3/0481 |
| | | | 715/764 |
| 2010/0185651 A1* | 7/2010 | Crow | G06F 16/34 |
| | | | 707/769 |
| 2013/0103383 A1* | 4/2013 | Du | G06F 40/58 |
| | | | 704/3 |
| 2021/0103379 A1* | 4/2021 | Adachi | G06F 40/106 |
| 2022/0327850 A1* | 10/2022 | Miyauchi | H04N 1/00424 |
| 2023/0244848 A1* | 8/2023 | Hahn | G06F 40/106 |
| | | | 715/273 |
| 2024/0160838 A1* | 5/2024 | Anoun | G06V 30/158 |
| 2024/0193370 A1* | 6/2024 | Achiwa | G06F 40/295 |

\* cited by examiner

*Primary Examiner* — Giuseppi Giuliani

(57) ABSTRACT

A validation system enables concurrent visual validation of multiple electronic documents. A processor generates a custom user interface (UI) framework comprising two sections. The first section displays document previews, while the second holds extracted data, including identifiers for document and page IDs, along with entity positions and associated values across the documents. Upon user input on a specific document entity in the second section, the validation system concurrently loads document previews in the first section, displaying corresponding data values from the multiple documents. The updated visualization allows for validation and review operations across the documents, utilizing the received user input and loaded information.

18 Claims, 4 Drawing Sheets

VALIDATION SYSTEM AND METHOD FOR CONCURRENT VISUAL VALIDATION OF TWO OR MORE ELECTRONIC DOCUMENTS

FIELD OF TECHNOLOGY

The present disclosure relates to systems and methods for data validation in a policy review scenario in which data comparison across multiple documents is streamlined in a unified system. Moreover, the present disclosure further relates to the validation system and method for concurrent visual validation of two or more electronic documents.

BACKGROUND

In the realm of document validation, especially in scenarios requiring the simultaneous review of multiple electronic documents, conventional approaches have often posed significant challenges. Reviewers struggle with complex tasks when dealing with extensive documents that hold diverse information across numerous pages. The manual comparison of extracted data against original content across multiple documents is not just time-consuming but also prone to errors. These inefficiencies escalate when corrections or validations demand cross-document referencing, leading to increased complexities and delays in the review process.

Moreover, existing systems lack an integrated solution that seamlessly combines visual document previews with extracted data in a unified interface. Navigating through multiple documents while simultaneously correlating extracted information in real-time has remained a challenge.

Therefore, in light of the foregoing discussion, there exists a need to overcome the aforementioned drawbacks.

BRIEF SUMMARY OF THE DISCLOSURE

The present disclosure provides a method and a system for concurrent visual validation of two or more electronic documents. The present disclosure seeks to provide a solution to the existing problem of inefficient and time-consuming data validation processes in scenarios involving multiple electronic documents. An aim of the present disclosure is to provide a solution that overcomes at least partially the problems encountered in the prior art and provide an improved method and an improved system for concurrent visual validation of the two or more electronic documents. The goal is to streamline the validation process, enhance accuracy in comparing data across multiple documents, and significantly reduce the time required for comprehensive data validation, thereby improving efficiency in document review and validation procedures.

In one aspect, the present disclosure provides a validation system for concurrent visual validation of two or more electronic documents. The validation system comprises a processor configured to render a custom user interface (UI) framework comprising a first section and a second section operatively linked to the first section. The first section is configured to hold document previews of the two or more electronic documents. The second section is configured to hold extracted data. The extracted data comprises a plurality of identifiers indicative of at least document identity (ID) and page ID of each of the two or more electronic documents, position coordinates of a set of document entities and corresponding values distributed at various positions across each of two or more electronic documents. The processor is further configured to receive a user input on a first document entity of the set of document entities in the second section. The processor is further configured to, based on the plurality of identifiers and the position coordinates of the set of document entities, concurrently load for each of the two or more electronic documents a specific document preview in the first section comprising data values corresponding to the first document entity present in the two or more electronic documents. The processor is further configured to update a visualization in the first section to cause the data values corresponding to the first document entity to be visible for validation and for review operations for any of the two or more electronic documents, based on the received user input and the loading.

The validation system of the present disclosure enhances the concurrent validation process for multiple electronic documents. The validation system controls a custom User Interface (UI) framework with distinct sections dedicated to document previews and extracted data. Within the custom UI framework, the validation system efficiently manages extracted data, encompassing identifiers, position coordinates, and corresponding values distributed across the two or more documents. The validation system has an ability to facilitate concurrent visual validation by allowing users to interactively select specific document entities for review and validation. This interactive functionality, coupled with the system's capability to load precise document previews based on identifiers and coordinates, streamlines the validation process across the two or more electronic documents. Moreover, the system dynamically updates visualizations based on user inputs and loaded data, ensuring that relevant data values corresponding to the selected document entity are prominently displayed for efficient validation and review operations. In conclusion, the validation system provides a user-friendly, comprehensive platform that optimizes the validation and review of electronic documents, offering a unified interface for streamlined and interactive validation processes.

Furthermore, by allowing users to interactively select specific document entities, it enhances the navigation process. This interactive functionality aids in swiftly identifying and focusing on particular entities for review and validation across various electronic documents. Additionally, the system's capability to load precise document previews based on identifiers and coordinates significantly streamlines navigation, making it more intuitive and efficient for users to traverse and compare information within the two or more electronic documents.

In another aspect, the present disclosure provides a method for concurrent visual validation of two or more electronic documents. The method comprising rendering, by a processor, a custom user interface (UI) framework comprising a first section and a second section operatively linked to the first section. The first section is configured to hold document previews of the two or more electronic documents. The second section is configured to hold extracted data comprising: a plurality of identifiers indicative of at least document identity (ID) and page ID of each of the two or more electronic documents, position coordinates of a set of document entities and corresponding values distributed at various positions across each of two or more electronic documents. The method further comprises receiving, by the processor, a user input on a first document entity of the set of document entities in the second section. The method further comprises, based on the plurality of identifiers and the position coordinates of the set of document entities, concurrently loading, by the processor, for each of the two or more electronic documents, a specific document preview in the first section comprising data values corresponding to the first document entity present in the two or more electronic documents. The method further comprises updating, by the processor, a visualization in the first section to cause the data values corresponding to the first document entity to be visible for validation and for review operations for any of the two or more electronic documents, based on the received user input and the loading.

The method achieves all the advantages and technical effects of the system of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not too scaled. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
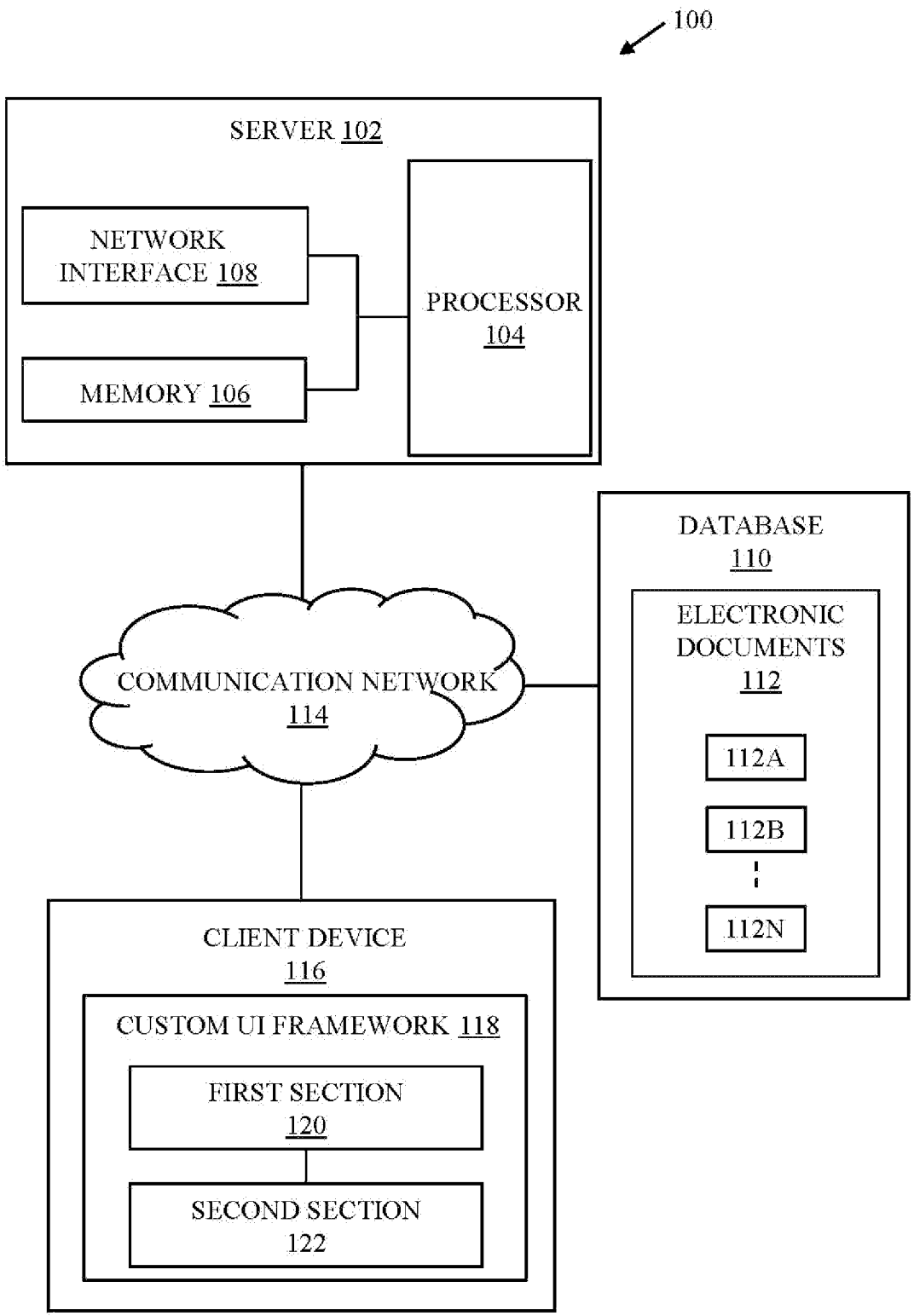
FIG. 1 is a block diagram of a validation system for concurrent visual validation of two or more electronic documents, in accordance with an embodiment of the present disclosure.

FIG. 1 is a block diagram of a system for concurrent visual validation of two or more electronic documents, in accordance with an embodiment of the present disclosure. With reference to FIG. 1, there is shown a block diagram of a system 100. The validation system 100 includes a server 102, a processor 104, a memory 106, and a network interface 108. The processor 104 is communicatively coupled with the memory 106. The processor 104 is further communicatively coupled with the network interface 108.

In an implementation, the processor 104 and the memory 106 may be implemented on the same server, such as the server 102. In other implementations, the processor 104, the memory 106, and the network interface 108 may be implemented on the same server, such as the server 102. The network interface 108 is configured to communicate with the processor 104 and the memory 106. The server 102 is communicatively coupled with a database 110, via a communication network 114. The database 110 includes two or more electronic documents 112 including a first electronic document 112A, a second electronic document 112B, and so on up to a Nth electronic document 112N. The server 102 may be communicatively coupled to a plurality of client devices, such as a client device 116, via the communication network 114. There is further shown a custom user interface (UI) framework 118 including a first section 120 and a second section 122 operatively linked to the first section 120 rendered on the client device 116.

The present disclosure provides the validation system 100 (interchangeably referred to as the system 100) for concurrent visual validation of the two or more electronic documents 112, where the system 100 renders the custom UI framework 118 including two sections. The first section 120 displays previews of the two or more electronic documents 112, while the second section 122 holds extracted data, including identifiers for each of the two or more electronic documents 112 and page IDs, along with entity positions and associated values across the two or more electronic documents 112. Upon the user input on a specific document entity in the second section 122, the system 100 concurrently loads previews of the two or more electronic documents 112 in the first section 120, displaying corresponding data values from the two or more electronic documents 112. The updated visualization allows for validation and review operations across the two or more electronic documents 112, utilizing the received user input and loaded information. The term "identifier of a document" refers to a specific code, label, or information that uniquely identifies and distinguishes an individual document within a system or dataset. Such an identifier typically includes information such as a document ID number, a unique alphanumeric code, or any other designation that allows the system to recognize and differentiate between various documents.

The server 102 is configured to communicate with the client device 116 via the communication network 114. In an implementation, the server 102 may be a master server or a master machine that is a part of a data center that controls an array of other cloud servers communicatively coupled to it for load balancing, running customized applications, and efficient data management. Examples of the server 102 may include, but are not limited to, a cloud server, an application server, a data server, or an electronic data processing device.

The processor 104 refers to a computational element that is operable to respond to and processes instructions that drive the system 100. The processor 104 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. In some implementations, the processor 104 may be an independent unit and may be located outside the server 102 of the system 100. Examples of the processor 104 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The memory 106 refers to a volatile or persistent medium, such as an electrical circuit, magnetic disk, virtual memory, or optical disk, in which a computer can store data or software for any duration. Optionally, the memory 106 is a non-volatile mass storage, such as a physical storage media. Furthermore, a single memory may encompass and, in a scenario, and the system 100 is distributed, the processor 104, the memory 106 and/or storage capability may be distributed as well. Examples of implementation of the memory 106 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The network interface 108 refers to a communication interface to enable communication of the server 102 to any other external device, such as the client device 118. Examples of the network interface 108 include, but are not limited to, a network interface card, a transceiver, and the like.

The database 110 refers to an organized collection of structured information or data stored electronically in a computing device. The database 110 is designed to efficiently manage, store, retrieve, and manipulate data according to specific requirements.

The communication network 114 includes a medium (e.g., a communication channel) through which the client device 116 communicates with the server 102. The communication network 114 may be a wired or wireless communication network. Examples of the communication network 114 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

The client device 116 refers to an electronic computing device operated by a user. The client device 116 includes the custom UI framework 120. The first user interface 120 is configured to receive the multimodal input from at least one user. The client device 116 may be configured to obtain a user input in a natural language in a dialog box rendered over the custom UI framework 118 and communicate the user input to the server 102. Examples of the client device 116 may include but not limited to a mobile device, a smartphone, a desktop computer, a laptop computer, a Chromebook, a tablet computer, a robotic device, or other user devices.

The custom UI framework 118 refers to a user interface design or structure that is tailored or specifically created for a particular application, system, or purpose. The custom UI framework 118 is a graphical layout or arrangement of interactive elements, controls, and features within a software application, specifically customized to meet the requirements and functionalities of the associated software or system. The custom UI framework 118 is designed and implemented to provide users with a unique, intuitive, and efficient interface that best suits the needs and functionalities of the associated software or system. The first section 120 and the second section 122 are rendered over the custom UI framework 118

The first section 120 refers to a distinct portion or segment within the user interface framework. Specifically, the first section 120 represents a designated area or space within a graphical user interface (GUI) that is designed to display document previews of the two or more electronic documents 112. The first section 120 is dedicated to presenting visual representations or previews of the two or more electronic documents 112, allowing users to view snapshots or concise representations of the content contained within each electronic document simultaneously or in a structured manner.

The second section 122 refers to another distinct area or segment within the custom UI framework 118. The second section 122 is specifically designated to contain extracted data related to the two or more electronic documents 112 being validated. The second section 122 holds various elements such as identifiers specifying document and page identity, position coordinates of document entities, and associated values distributed across the multiple documents. The second section 122 serves as a repository or display area for this extracted data, enabling users to access and utilize this information for concurrent validation and review purposes across the two or more electronic documents 112.

It should be understood by one of the ordinary skills in the art that the operations of the system 100 are explained by using a single client device. However, the operation of the system 100 is equally applicable for a number of user queries received from thousands to millions of client devices, where user requests are processed in parallel.

In operation, the processor 104 is configured to render the custom UI framework 118 including the first section 120 and the second section 122 operatively linked to the first section 120. The first section 120 is configured to hold document previews of the two or more electronic documents 112. The second section 122 is configured to hold extracted data. The extracted data includes the plurality of identifiers indicative of at least document identity (ID) and page ID of each of the two or more electronic documents 112. The extracted data further includes position coordinates of a set of document entities and corresponding values distributed at various positions across each of the two or more electronic documents 112. The processor 104 ensures an operational linkage between the first second 120 and the second section 122. The linkage between the first second 120 and the second section 122 allows for seamless interaction and synchronization between the displayed document previews in the first section 120 and the extracted data presented in the second section 122, enabling users to validate and review data across the multiple documents efficiently.

The processor 104 is further configured to receive the user input on a first document entity of the set of document entities in the second section 122. Specifically, the processor 104 is configured to accept and process user input related to a specific document entity. The input may be in the form of a selection, click, or action performed by the user on the specific document entity displayed within the second section 122 of the custom UI framework 118. The users may provide the input to initiate a validation or review action related to a particular document entity. For instance, clicking or selecting an entity within the second section could trigger the system to focus on or highlight that entity in the corresponding document preview displayed in the first section 120. By receiving the user input on the specific document entity within the extracted data section, the processor 104 may identify which document entity the user intends to review or validate. This serves as a cue for the client device 116 to load and display the corresponding document preview in the first section 120, providing visual context for the selected entity and facilitating concurrent visual validation across the two or more electronic documents 112.

The processor 104 is further configured to concurrently load, for each of the two or more electronic documents 112, a specific document preview in the first section 120 including data values corresponding to the first document entity present in the two or more electronic documents 112, based on the plurality of identifiers and the position coordinates of the set of document entities. In this regard, the processor 104 is designed to simultaneously load distinct document previews for each of the two or more electronic documents 112 into the first section 120 of the custom UI framework 118. The loading process happens concurrently, meaning the loading process occurs simultaneously for each electronic document. The loaded document previews in the first section 120 include specific data values corresponding to the first document entity selected in the second section 122. The specific data values are based on the plurality of identifiers (such as document and page IDs) and position coordinates associated with the set of document entities. The purpose of the concurrent loading of the specific document preview is to provide users with a side-by-side or simultaneous visual representation of the selected document entity (i.e., in this case, the first document entity) across the two or more electronic documents 112 being reviewed. The concurrent loading allows users to compare how the specific data values associated with a chosen entity (i.e., the first document entity) appear within each electronic document. Specifically, by leveraging the identifiers and position coordinates stored in the extracted data section, the processor 104 identifies and retrieves the relevant data values from each electronic document. The processor 104 then loads the retrieved data values into their respective document previews displayed in the first section 120, enabling users to visually inspect and validate the data across the two or more electronic documents 112 simultaneously. In some implementations, in order to concurrently load the specific document preview in the first section 120, the processor 104 is configured to update a current viewport to an updated viewport in the first section 120 of the custom UI framework 118 by automatically moving from one section of a page to another section of the same page or by moving across multiple pages to point to the specific document preview corresponding to the first document entity in the second section 122. The term "viewport" refers to the visible area or the portion of the document preview displayed within the first section 120 of the custom UI framework 118. The viewport represents the specific visible segment of the document being presented to the user at a given time.

The processor 104 is further configured to update a visualization in the first section 120 to cause the data values corresponding to the first document entity to be visible for validation and for review operations for any of the two or more electronic documents 112, based on the received user input and the loading. In other words, the processor 104 is programmed to modify or refresh the displayed visualization within the first section 120 of the custom UI framework 118. The updating of the visualization in the first section 120 is specifically intended to make the data values associated with the first document entity visible for validation and review operations across the two or more electronic documents 112. The primary objective of the updating of the visualization in the first section 120 is to provide the users with a clear and accessible view of the data values linked to the selected document entity (i.e., the first document entity in this case). By ensuring visibility across the two or more electronic documents 112, the users may efficiently validate and review the particular data element without having to navigate through each of the two or more electronic documents 112 separately. In some examples, the update is triggered by the user input received on the specific document entity within the second section 122. In such example, the input serves as a command to focus on or highlight the chosen entity. Leveraging the concurrently loaded document previews and the extracted data values associated with the selected entity, the processor 104 modifies the visualization within the first section 120 to emphasize or display the relevant data values for efficient validation and review operations. Advantageously, by updating the visualization to highlight the data values across the two or more electronic documents 112, the system 100 streamlines the validation process. The system 100 simplifies the user's task by presenting relevant information in a consolidated and easily accessible manner, aiding in efficient validation and review across the two or more electronic documents 112.

In some implementations, the review operations are executable on any of the two or more electronic documents 112 via the specific document preview in the first section 120 based on the visualization. The review operations includes, but not limited to, two or more of: a search operation, a print operation, a presentation mode change, a document rotate operation, a navigation operation, a zoom operation, an edit operation, and other document processing operations. The search operation allows users to find specific keywords, phrases, or elements within an electronic document, enabling quick navigation to relevant sections. The print operation initiates the printing of the electronic document or a specific portion thereof, creating a physical or digital copy. The presentation mode change alters the display settings to facilitate a presentation, typically maximizing readability or emphasizing specific content. The document rotate operation rotates the document orientation (e.g., from portrait to landscape or vice versa) for easier viewing or editing. The navigation operation facilitates movement within the electronic document, including scrolling, page flipping, or jumping to designated sections. The zoom operation adjusts the document's magnification level, enabling users to enlarge or reduce the displayed content for better readability or focus. The edit operation allows modification of the document content, including text editing, annotations, or insertion/deletion of elements. Other document processing operations may encompasses various additional functionalities tailored to specific needs, such as annotation tools, document merging, formatting changes, or data extraction tools.

In some implementations, the processor 104 is further configured to split each of the two or more electronic documents 112 into a set of pages. The processor 104 is further configured to generate a canvas object for each page of the set of pages for each of the two or more electronic documents 118. The splitting action is performed to break down each of the two or more electronic documents 112 into smaller, more manageable units or sections, enhancing the ability of the client device 116 to handle and process the content effectively. The generation of the canvas objects provides a structured and manipulable platform to represent and interact with individual document pages within the system 100. Using algorithms or designated methodologies, the processor 104 separates each electronic document into its constituent pages, enabling easier handling and manipulation of document content. Further, the processor 104 generates such canvas objects, which serve as structured representations of the individual pages. Such canvas objects likely contain information and properties necessary for displaying and manipulating the content of each page within the custom UI framework 118 of the client device 116.

In some other implementations, the processor 104 is further configured to generate a bounding box (BB) layer for each page of the set of pages for each of the two or more electronic documents 112. The BB layer refers to a visual representation or overlay created within a document or image to enclose and define specific objects, elements, or regions of interest. The BB layer is a rectangular or polygonal outline drawn around a particular entity, such as text, images, data fields, or any identifiable element within a document or image. The BB serves as a marker or delineator, indicating the boundaries and location of the identified entity or object. The purpose of generating such BB layers is to establish designated areas or regions within each electronic document page to encapsulate and define specific entities or elements of interest, such as text, images, or data fields. In some examples, using algorithms or predefined criteria, the processor 104 creates such bounding box layers, which serve as overlays or markers on each electronic document page. The BB layers outline and encapsulate distinct entities or data points within the document content, allowing for efficient identification and manipulation of these elements.

In another implementation, the processor 104 is further configured to generate a text layer for each page of the set of pages for each of the two or more electronic documents 112. The text layer refers to a structured representation of textual content extracted from a document's pages. The text layer is a digital layer created within a document-processing system that specifically contains the text content found on each page of each electronic document. The text layer is separate from the document's visual representation and typically includes the actual text in a format that allows for easy manipulation, extraction, and analysis. The text layer preserves the text's spatial arrangement, formatting, and hierarchy found within the original document. In some examples, the purpose behind generating the text layers is to extract and store textual content present on each document page in a structured and accessible format. By utilizing optical character recognition (OCR) technology or similar algorithms, the processor 104 scans, identifies, and extracts text from each document page. The processor 104 then organizes this extracted text into a separate layer or structured format, creating a textual representation of the content within each page.

In yet another implementation, the processor 104 is further configured to extract from each of the two or more electronic documents 112, the set of document entities and the plurality of identifiers. The purpose behind the extraction process is to identify and gather specific elements or entities within the two or more electronic documents 112, such as text, images, or data fields, along with their corresponding identifiers like document identity (ID) and page ID. The extraction enables detailed analysis and handling of document content. Using algorithms or techniques specific to document analysis, the processor 104 scans and identifies document entities (textual, graphical, or other elements) within each electronic document. Simultaneously, the processor 104 retrieves relevant identifiers that uniquely identify these entities, such as document ID and page ID. In addition, the processor 104 is further configured to determine the position coordinates of the extracted set of document entities and store the position coordinates as a part of the extracted data. Specifically, the processor 104 utilizes spatial analysis or positional algorithms to determine the exact coordinates (e.g., X and Y coordinates) of the extracted entities within the document pages. Such coordinates are then stored as part of the extracted data, forming a detailed dataset that includes both the entities and their respective positions within the two or more electronic documents 112. The determination of the position coordinates of the extracted set of document entities and then storing the position coordinates as the extracted data enables the processor 104 to not only extract and catalogue document entities with their identifiers but also to pinpoint and store their exact positional information within the two or more electronic documents 112. This detailed extracted data set serves as a valuable resource for subsequent operations such as visualization, validation, or manipulation of the document content.

In yet another implementation, the processor 104 is further configured to establish a mapping between each document entity of the set of document entities and corresponding electronic document of the two or more electronic documents 112 based on the extracted data. In other words, the processor 104 is set up to create a connection or association between each document entity within the set of document entities and the specific electronic document it belongs to, from among the multiple electronic documents 112. The purpose behind establishing such mapping is to link and identify which document entity corresponds to or originates from which electronic document. It helps organize and track entities across the two or more electronic documents 112. By using the extracted data containing identifiers like the document identity (ID) and the page ID, along with the position coordinates of document entities, the processor 104 creates a systematic linkage or mapping. By analyzing the identifiers and positional information, the processor 104 establishes connections between each entity and its respective electronic document. Advantageously, the mapping process allows the client device 116 to precisely associate individual document entities with their originating electronic documents, enabling streamlined referencing, retrieval, and manipulation of specific entities within the two or more electronic documents 112.

In some embodiments, the processor 104 is further configured to receive a user input on the first section 120 of the custom UI framework 118. In this regard, the user input corresponds to a one-click entities highlight feature. The processor 104 is further configured to execute a pre-programmed function associated with the first section 120 of the custom UI framework 118 to identify and highlight each document entity within a defined BB of a set of relevant entities across the two or more electronic documents 112 being validated in the custom UI framework 118.

Figure 2A:
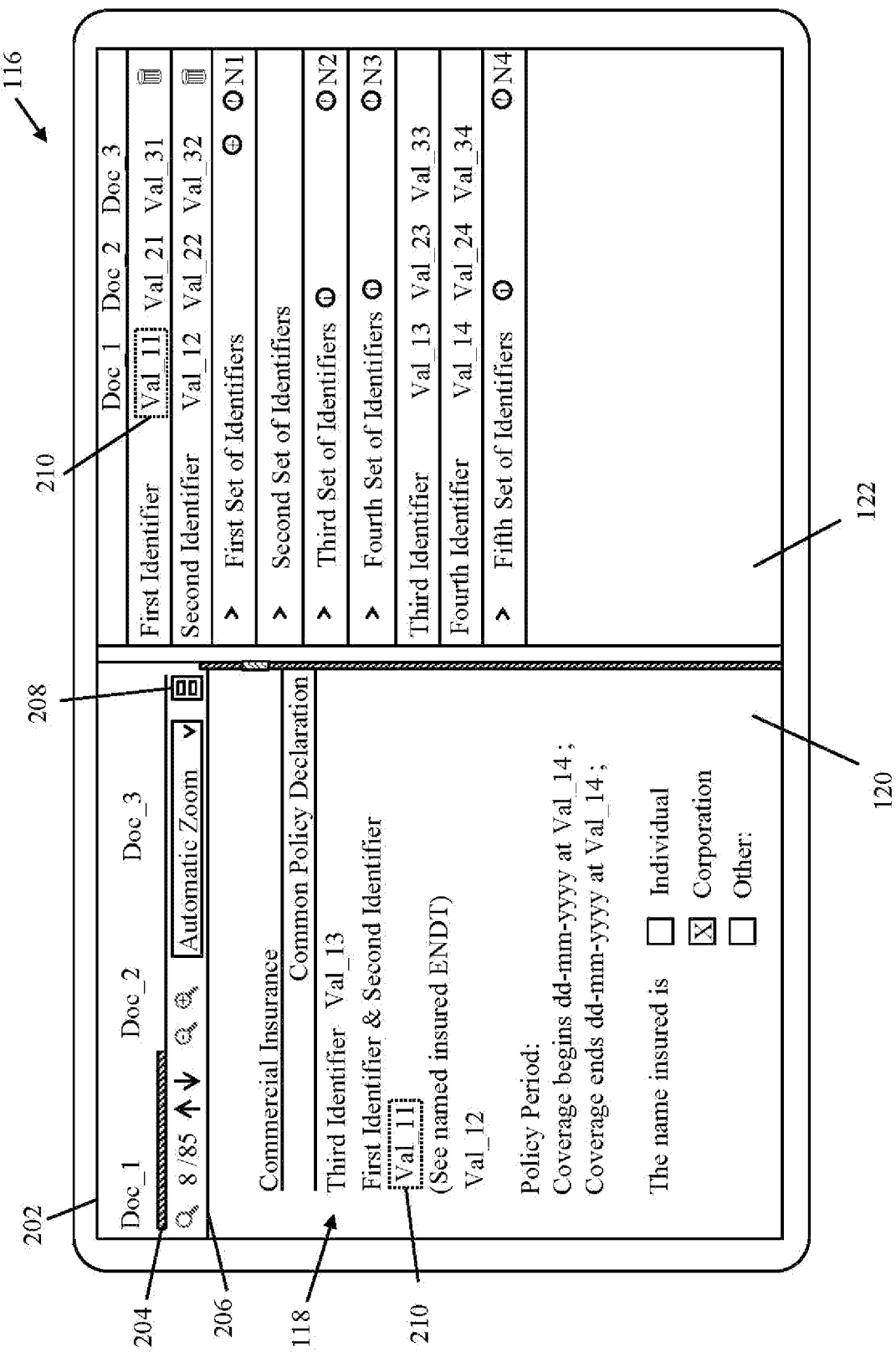
FIG. 2A is a schematic diagram of a client device depicting an exemplary custom user interface (UI) framework, in accordance with an embodiment of the present disclosure.

FIG. 2A is a schematic diagram of a client device depicting an exemplary custom UI framework, in accordance with an embodiment of the present disclosure. FIG. 2A is described in conjunction with the elements of FIG. 1. With reference to FIG. 2A, there is shown a schematic diagram of the client device 116 depicting the exemplary custom UI framework (for example, the custom UI framework 118). In some implementations, the client device 116 includes a display 202 that depicts the custom UI framework 118. As discussed above and illustrated in FIG. 2A, the custom UI framework 118 includes the first section 120 and the second section 122.

The first section 120 holds the document previews of a first document (Doc_1), a second document (Doc_2) and a third document (Doc_3). In some implementations, the first section 120 is configured to hold the document previews of any number of the two or more electronic documents 112. As shown in the FIG. 2A, the Doc_1 is currently shown in the first section 120 of the custom UI framework 118. However, the user may toggle among the Doc_1, Doc_2, and Doc_3 by interacting with a value corresponding to the respective document in the second section 122. There is also a toggle indicator 204 to depict the respective document shown in the first section 120. The first section 120 further includes a menu bar 206 containing a list of options or commands (i.e., a set of menus) related to specific functionalities or operations. In some examples, when a menu from the set of menus is clicked or hovered over, the menu drops down to display a list of related options or sub-menus that the users may use to execute specific actions or access various parts of the application. As illustrated in the embodiment of FIG. 2A, the menu bar 206 includes a search feature, a page down feature, a page up feature, a zoom-in feature, a zoom-out feature, and an automatic zoom feature with a drop down option for magnification. The menu bar 206 further includes a one-click entities highlight feature 208. However, in some other embodiments, the menu bar 206 may include, but limited to, an edit feature, a more options feature, a rotate feature, a re-size feature, a pan tool feature, and the like.

Further, the second section 122 holds the extracted data. As discussed above, the extracted data includes the plurality of identifiers and corresponding values. As illustrated in the embodiment of FIG. 2A, there are identifiers and sets of identifiers including more identifiers and their corresponding values. The identifiers such as a first identifier, a second identifier, a third identifier and a fourth identifier have the corresponding values with respect to the first document, the second document, and the third document. For example, the first identifier has a first value (Val_11) for the first document, a second value (Val_21) for the second document, and a third value (Val_31) for the third document. Similarly, the second identifier has a first value (Val_12) for the first document, a second value (Val_22) for the second document, and a third value (Val_32) for the third document. Similarly, the third identifier has a first value (Val_13) for the first document, a second value (Val_23) for the second document, and a third value (Val_33) for the third document. Similarly, the fourth identifier has a first value (Val_14) for the first document, a second value (Val_24) for the second document, and a third value (Val_34) for the third document. In addition, there is shown an exclamatory mark along with a number (for example, N1, N2, N3, N4) to show the issues or errors associated with the sets of identifiers.

In addition, in the second section 122, the Val_11 is interacted. The interaction may include, but not limited to, being clicked or hovered. The Val_11 is bounded by a bounding box 210 after interaction. At the same time, the document corresponding to the Val_11 is toggled and the Val_11 in the first section 120 is also bounded by the bounding box 210. It should be noted that the above mentioned scenarios is exemplary and in some other examples, the scenario may be different. For example, instead of the bounding box 210, a highlight layer may be used to depict a difference between the interacted value and the rest of the document. Moreover, other values may also be interacted to depict that value in the first section 120 in a comparable manner.

Figure 2B:
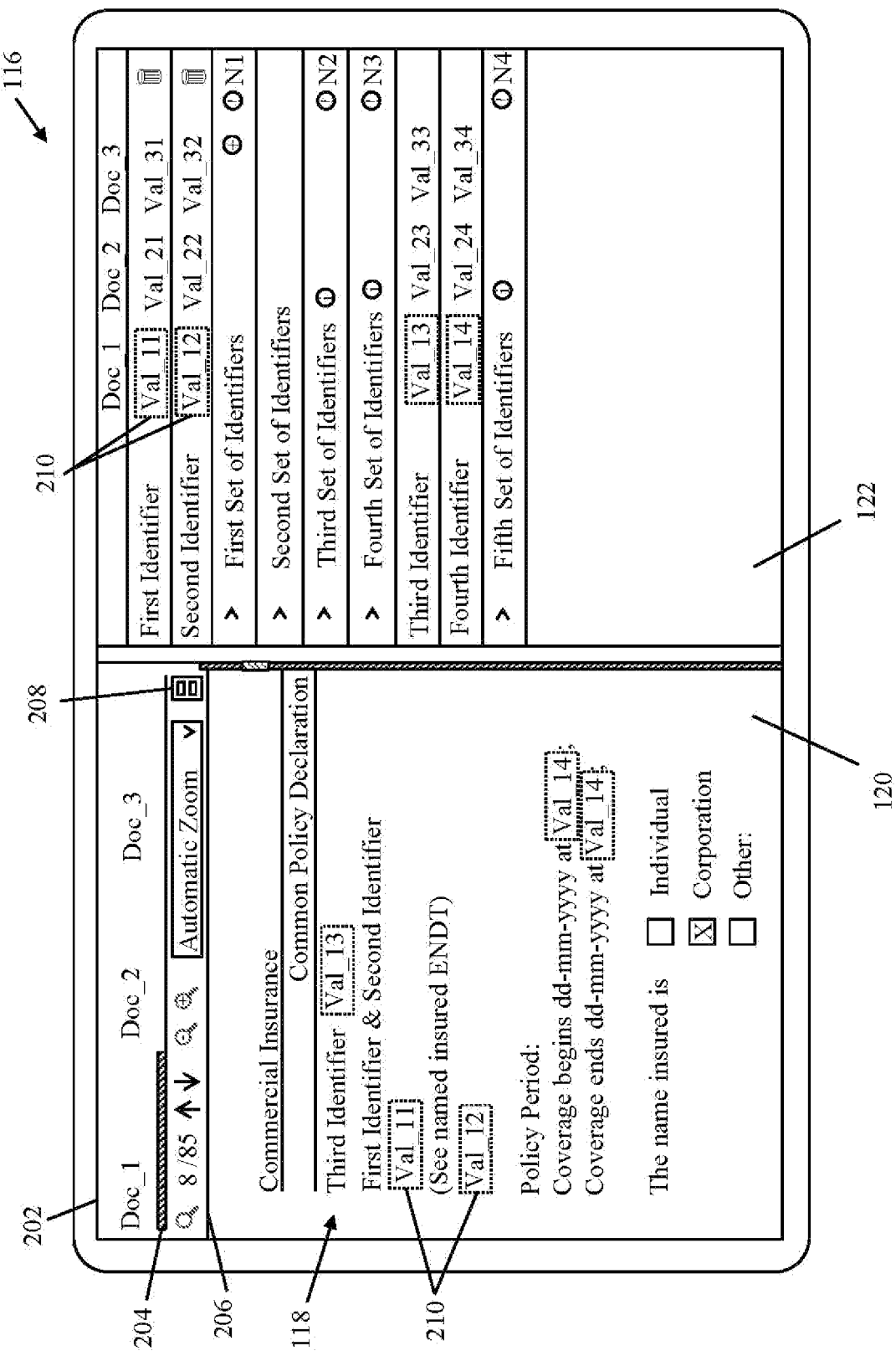
FIG. 2B is another schematic diagram of a client device depicting another exemplary custom UI framework, in accordance with another embodiment of the present disclosure.

FIG. 2B is another schematic diagram of a client device depicting another exemplary custom UI framework, in accordance with another embodiment of the present disclosure. FIG. 2B is described in conjunction with the elements of FIG. 1. With reference to FIG. 2B, there is shown a schematic diagram of the client device 116 depicting the exemplary custom UI framework (for example, the custom UI framework 118) where the one click entities highlight feature is enabled. When the user input is received within the first section 120 of the custom UI framework 118, the one-click entities highlight feature is triggered. In other words, when the user clicks on the one-click entities highlight feature from the menu bar 206, the one-click entities highlight feature is triggered. This may execute a predefined function linked to the first section 120 to identify and highlight each document entity within a specified bounding box such as the bounding box 210, encompassing a set of relevant entities across the two or more electronic documents 112 being validated in the custom UI framework 118.

Figure 3:
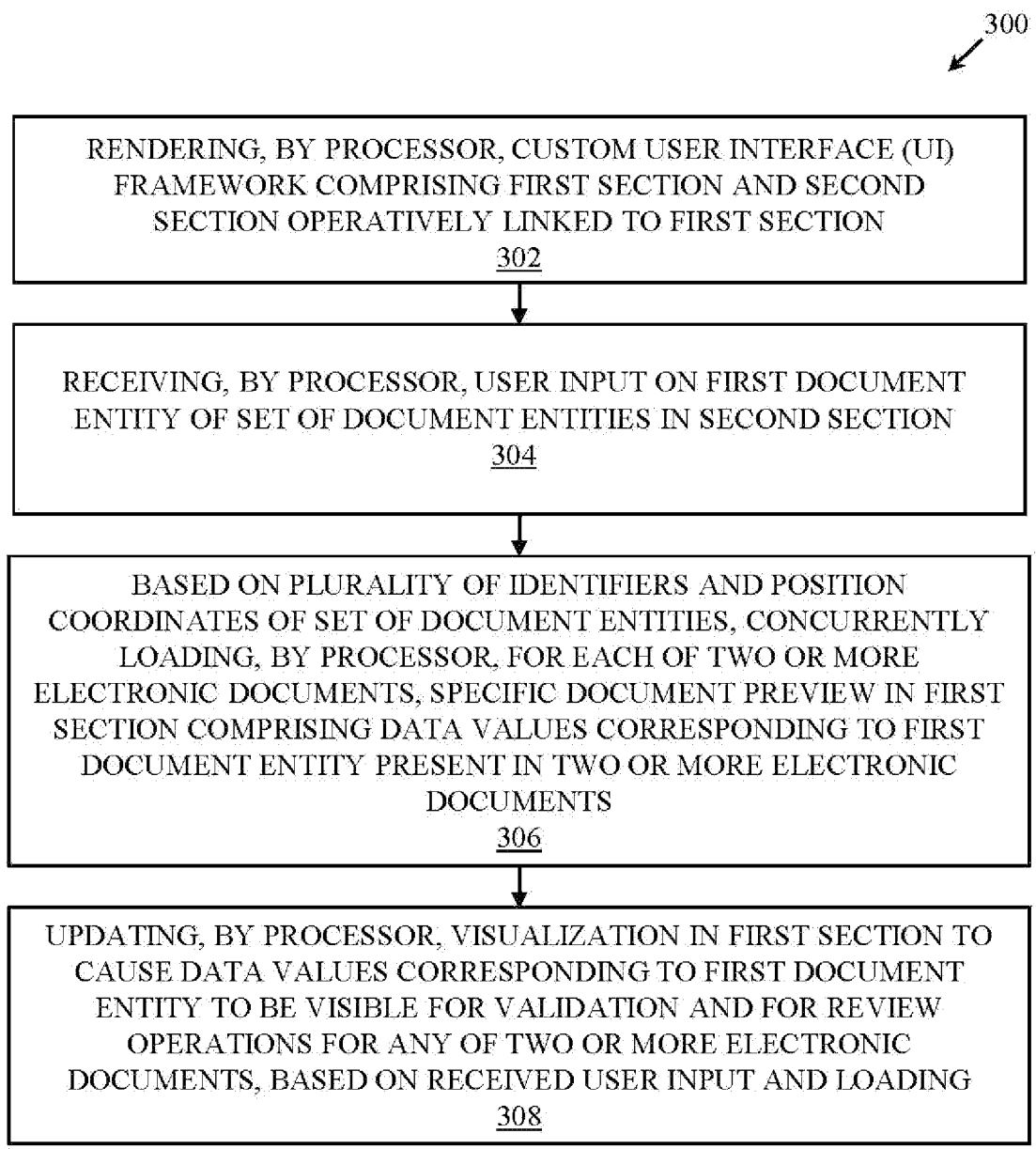
FIG. 3 is a flowchart of a method for concurrent visual validation of the two or more electronic documents, in accordance with an embodiment of the present disclosure.

FIG. 3 is a flowchart of a method for concurrent visual validation of two or more electronic documents, in accordance with an embodiment of the present disclosure. FIG. 4 is described in conjunction with the elements of FIGS. 1, 2A, and 2B. With reference to FIG. 3, there is shown a method 300 for concurrent visual validation of two or more electronic documents. The method 300 includes steps from 302 to 308.

At step 302, the method 300 includes rendering, by the processor 104, the custom UI framework 118 comprising the first section 120 and the second section 122 operatively linked to the first section 120. The technical effect of this rendering process lies in the creation of a structured and interconnected interface, enabling concurrent visual validation of the two or more electronic documents 112. The linkage between the first section 120 and the second section 122 facilitates efficient navigation, comparison, and validation of data entities extracted from the two or more electronic documents 112. The custom UI framework 118 design allows users to interactively review and validate data across the two or more electronic documents 112, aiding in the streamlined analysis and manipulation of information extracted from multiple sources. The interconnectedness of the first section 120 and the second section 122 enhances the user's ability to visually correlate extracted data with respective document previews, optimizing the validation process within the custom UI framework 118.

At step 304, the method 300 includes receiving, by the processor 104, the user input on the first document entity of the set of document entities in the second section 122. By receiving the user input linked to a document entity (for example the first document entity), the processor 104 is primed to initiate subsequent actions based on the user input. The user interaction serves as a trigger point for the processor 104 to process and respond to the user's command or selection, setting the stage for further operations. This step empowers user-driven interactions within the method 300, facilitating user-directed navigation, selection, or identification of document entities for further processing, such as validation, review, or other pertinent operations. Moreover, this may facilitate a more dynamic and user-centric approach to document validation and analysis within the custom UI framework 118.

At step 306, the method 300 further includes, based on the plurality of identifiers and the position coordinates of the set of document entities, concurrently loading, by the processor 104, for each of the two or more electronic documents 112, a specific document preview in the first section 120 comprising data values corresponding to the first document entity present in the two or more electronic documents 112. The concurrent loading of the specific document preview in the first section 120 includes updating a current viewport to an updated viewport in the first section 120 of the custom UI framework 118 by automatically moving from one section of a page to another section of the same page or by moving across multiple pages to point to the specific document preview corresponding to the first document entity in the second section 122. The navigation involves dynamic movements between the first section 120 and the second section 122 of a page or across multiple pages, precisely targeting and displaying the particular document preview corresponding to the initial document entity selected within the second section 122. The technical functionality enhances user interaction by dynamically presenting the relevant document previews within the custom UI framework 118, directly correlating with the selected document entity. Further, this facilitates streamlined validation and comparison of extracted data across the two or more electronic documents 112, ensuring a focused and efficient user experience within the custom UI framework 118.

At step 308, the method 300 further includes updating, by the processor 104, a visualization in the first section 120 to cause the data values corresponding to the first document entity to be visible for validation and for review operations for any of the two or more electronic documents 112, based on the received user input and the loading. By updating the visualization, the method 300 enables users to interactively review and validate data associated with the selected document entity. This update process is triggered by received user input and concurrent document loading. This technical functionality may enhance user engagement by dynamically presenting and making visible the relevant data values corresponding to the initial document entity across the two or more electronic documents 112. This may empower users to efficiently conduct validation and review operations within the custom UI framework 118, facilitating a seamless and focused user experience during the document analysis process.

In some implementations, the method 300 further includes splitting, by the processor 104, each of the two or more electronic documents 112 into a set of pages. In this regard, the processor 104 divides each of the two or more electronic documents 112 into a structured set of individual pages. This segmentation is aimed at organizing and managing the content within the documents into distinct, manageable sections. The method 300 further includes generating, by the processor 104, the canvas object for each page of the set of pages for each of the two or more electronic documents 112. In this regard, for each page created in the previous step, the processor 104 generates corresponding canvas objects. Such canvas objects serve as digital spaces or representations for the content present on each page. The canvas objects provide an area where graphical elements, text, or other document components can be visually represented and manipulated. The technical effect of slipping the pages and generating the canvas object is the systematic structuring of electronic documents into pages and the creation of canvas objects for these pages. This process facilitates a more organized and manageable representation of document content within the custom UI framework 118, allowing for easier manipulation, visualization, and potential further processing of each individual page's content.

In some implementations, the method 300 further includes generating, by the processor 104, the BB layer for each page of the set of pages for each of the two or more electronic documents 112. The technical effect of generating the BB layer is the creation of visual markers or boundaries around particular elements, entities, or regions of interest present on each page of the documents. The bounding boxes serve to delineate and identify specific components within the document pages, aiding in the precise localization and representation of distinct entities or segments for further processing, analysis, or visual emphasis within the custom UI framework 118.

In some implementations, the method 300 further includes generating, by the processor 104, the text layer for each page of the set of pages for each of the two or more electronic documents 112. The technical effect of creating the text layers is the transformation of the textual information present within the document pages into a structured and machine-readable format. The structured representation facilitates easier access, retrieval, and manipulation of the text-based data within the two or more electronic documents 112. Further, this may facilitate functionalities like text search, indexing, extraction, and analysis within operations of the method 300, enhancing the ability to interact with and manage text-based content within the one or more electronic documents 112.

In some implementations, the method 300 further includes establishing, by the processor 104, the mapping between each document entity of the set of document entities and corresponding electronic document of the two or more electronic documents 112 based on the extracted data. The technical effect of establishing the mapping between the document entity and the corresponding electronic document is the creation of an organized and structured association between each identified document entity and its respective electronic document. This mapping allows for streamlined reference and retrieval of specific entities within their corresponding documents. This may facilitate efficient cross-referencing and identification of entities, enhancing the capability of the method 300 to navigate and manage document entities across the two or more electronic documents 112 within the custom UI framework 118.

In some implementations, the method 300 further includes extracting, by the processor 104, from each of the two or more electronic documents 112: the set of document entities and the plurality of identifiers. The extraction serves as a foundational step, supplying the method 300 with the necessary data for mapping, reference, and subsequent processing. This may enhance the capability of the method 300 to work with specific document entities and their corresponding identifiers across the two or more electronic documents 112 within the custom UI framework 118.

In some implementations, the method 300 further includes determining, by the processor 104, the position coordinates of the extracted set of document entities and storing the position coordinates as a part of the extracted data. By storing the position coordinates as part of the extracted data, accurate referencing and localization of specific entities within their respective documents is facilitated. This process enhances the ability of the method 300 to navigate and manage document entities within the custom UI framework 118. The stored position coordinates contribute to improved visualization, identification, and validation of entities across the two or more electronic documents 112, augmenting the efficiency of the method 300 in handling document-related data.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A validation system for concurrent visual validation of two or more electronic documents, comprising:
   a processor configured to:
      render a custom user interface (UI) framework comprising a first section and a second section operatively linked to the first section;
         wherein the first section is configured to hold document previews of the two or more electronic documents, and
         wherein the second section is configured to hold extracted data comprising:
            a plurality of identifiers indicative of at least document identity (ID) and page ID of each of the two or more electronic documents, and
            position coordinates of a set of document entities and corresponding values distributed at various positions across each of two or more electronic documents;
      receive a user input on a first document entity of the set of document entities in the second section;
      based on the plurality of identifiers and the position coordinates of the set of document entities, concurrently load for each of the two or more electronic documents, a specific document preview in the first section comprising data values corresponding to the first document entity present in the two or more electronic documents;
      generate a bounding box layer, based on the user input, to bound the data values in the first section and the second section; and
      update a visualization in the first section to cause the data values bounded in the bounding box layer generated within the first document entity to be visible for validation and for review operations for any of the two or more electronic documents, based on the received user input and the loading.

2. The validation system according to claim 1, wherein the processor is further configured to:
   split each of the two or more electronic documents into a set of pages; and
   generate a canvas object for each page of the set of pages for each of the two or more electronic documents.

3. The validation system according to claim 1, wherein the processor is further configured to generate a text layer for each page of the set of pages for each of the two or more electronic documents.

4. The validation system according to claim 1, wherein the processor is further configured to establish a mapping between each document entity of the set of document entities and corresponding electronic document of the two or more electronic documents based on the extracted data.

5. The validation system according to claim 1, wherein the processor is further configured to extract, from each of the two or more electronic documents: the set of document entities and the plurality of identifiers.

6. The validation system according to claim 5, wherein the processor is further configured to determine the position coordinates of the extracted set of document entities and store the position coordinates as a part of the extracted data.

7. The validation system according to claim 1, wherein in order to concurrently load the specific document preview in the first section, the processor is configured to update a current viewport to an updated viewport in the first section of the custom UI framework by automatically moving from one section of a page to another section of the same page or by moving across multiple pages to point to the specific document preview corresponding to the first document entity in the second section.

8. The validation system according to claim 1, wherein the processor is further configured to:
   receive a user input on the first section of the custom UI framework, the user input corresponds to a one-click entities highlight feature; and
   execute a pre-programmed function associated with the first section of the custom UI framework to identify and highlight each document entity within a defined bounding box of a set of relevant entities across the two or more electronic documents being validated in the custom UI framework.

9. The validation system according to claim 1, wherein the review operations are executable on any of the two or more electronic documents via the specific document preview in the first section based on the visualization and wherein the review operations comprises two or more of: a search operation, a print operation, a presentation mode change, a document rotate operation, a navigation operation, a zoom operation, an edit operation, and other document processing operations.

10. A method for concurrent visual validation of two or more electronic documents, the method comprising:

rendering, by a processor, a custom user interface (UI) framework comprising a first section and a second section operatively linked to the first section;
    wherein the first section is configured to hold document previews of the two or more electronic documents, and
    wherein the second section is configured to hold extracted data comprising:
        a plurality of identifiers indicative of at least document identity (ID) and page ID of each of the two or more electronic documents,
        position coordinates of a set of document entities and corresponding values distributed at various positions across each of two or more electronic documents; and
receiving, by the processor, a user input on a first document entity of the set of document entities in the second section;
based on the plurality of identifiers and the position coordinates of the set of document entities, concurrently loading, by the processor, for each of the two or more electronic documents, a specific document preview in the first section comprising data values corresponding to the first document entity present in the two or more electronic documents;
generating, by a processor, a bounding box layer, based on the user input, to bound the data values in the first section and the second section; and
updating, by the processor, a visualization in the first section to cause the data values bounded in the bounding box layer generated within the first document entity to be visible for validation and for review operations for any of the two or more electronic documents, based on the received user input and the loading.

11. The method according to claim 10, further comprising:
    splitting, by the processor, each of the two or more electronic documents into a set of pages; and
    generating, by the processor, a canvas object for each page of the set of pages for each of the two or more electronic documents.

12. The method according to claim 10, further comprising generating, by the processor, a text layer for each page of the set of pages for each of the two or more electronic documents.

13. The method according to claim 10, further comprising establishing, by the processor, a mapping between each document entity of the set of document entities and corresponding electronic document of the two or more electronic documents based on the extracted data.

14. The method according to claim 10, further comprising extracting, by the processor, from each of the two or more electronic documents: the set of document entities and the plurality of identifiers.

15. The method according to claim 14, further comprising determining, by the processor, the position coordinates of the extracted set of document entities and store the position coordinates as a part of the extracted data.

16. The method according to claim 10, wherein the concurrent loading of the specific document preview in the first section comprises updating a current viewport to an updated viewport in the first section of the custom UI framework by automatically moving from one section of a page to another section of the same page or by moving across multiple pages to point to the specific document preview corresponding to the first document entity in the second section.

17. The method according to claim 10, further comprising:
    receiving, by the processor, a user input on the first section of the UI framework, the user input corresponds to a one-click entities highlight feature; and
    executing, by the processor, a pre-programmed function associated with the first section of the UI framework to identify and highlight each document entity within a defined bounding box of a set of relevant entities across the two or more electronic documents being validated in the UI framework.

18. The method according to claim 10, wherein the review operations is executable on any of the two or more electronic documents via the specific document preview in the first section based on the visualization and wherein the review operations two or more of: comprises: a search operation, a print operation, a presentation mode change, a document rotate operation, a navigation operation, a zoom operation, an edit operation, and other document processing operations.

* * * * *